United States Patent [19]

Peterson et al.

[11] Patent Number: 4,719,950
[45] Date of Patent: Jan. 19, 1988

[54] TREE SIZE ADAPTABLE DEBARKING/DELIMBING APPARATUS

[75] Inventors: Arnold N. Peterson, Eugene; Larry A. Sprague, Dexter, both of Oreg.

[73] Assignee: Peterson Pacific Corporation, Pleasant Hill, Oreg.

[21] Appl. No.: 72,560

[22] Filed: Jul. 13, 1987

[51] Int. Cl.$^4$ .............................................. B27L 1/00
[52] U.S. Cl. ................... 144/208 J; 144/2 Z; 144/341; 144/343
[58] Field of Search ............... 144/2 Z, 208 R, 208 H, 144/208 J, 341, 343

[56] References Cited

U.S. PATENT DOCUMENTS

| | | | |
|---|---|---|---|
| 2,601,261 | 6/1952 | Carpenter | 144/208 J |
| 4,172,481 | 10/1979 | Brisson | 144/208 J |
| 4,214,616 | 7/1980 | Brisson | 144/208 J |
| 4,640,325 | 2/1987 | Vaders | 144/208 J |
| 4,690,187 | 9/1987 | Schmidt | 144/208 J |

*Primary Examiner*—W. Donald Bray
*Attorney, Agent, or Firm*—Robert L. Harrington

[57] ABSTRACT

A debarking/delimbing apparatus having upper and lower flailing drums mounted crossway to a feed line for logs progressing through the apparatus. The upper flailing drum is pivotally mounted to enable movement of the flails toward and away from the feed line to accommodate different sized logs. A counter force urges raising of the upper drum but not sufficient to offset totally the gravity force. A gate across the inlet is connected to the upper drum mounting and when engaged by a log raises the upper drum in accordance with the diameter of the log. The length of the flails are only as long as needed to reach down to the mid-point of the largest size logs.

5 Claims, 6 Drawing Figures

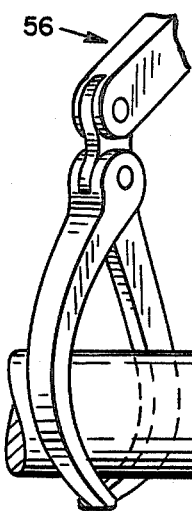
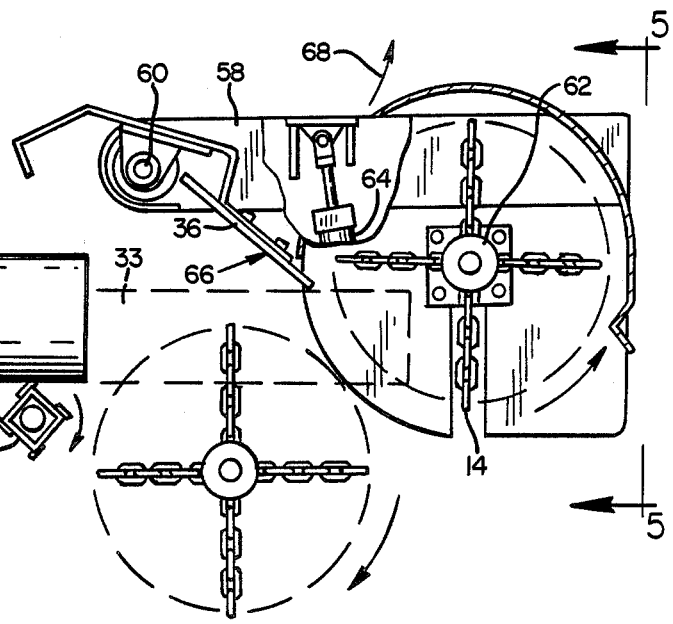
FIG. 3
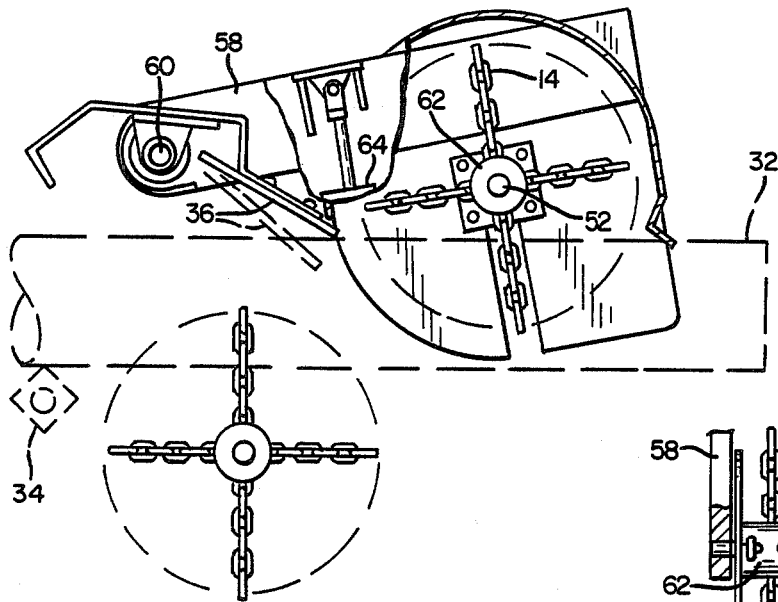
FIG. 4
FIG. 5
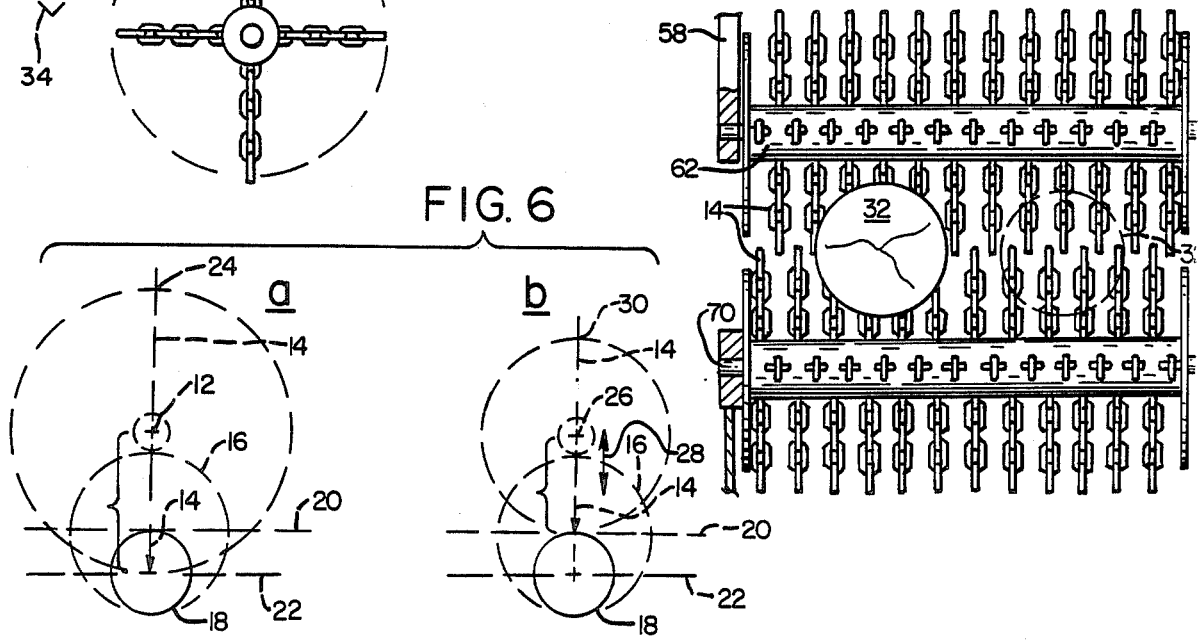
FIG. 6

TREE SIZE ADAPTABLE DEBARKING/DELIMBING APPARATUS

FIELD OF INVENTION

This invention relates to an apparatus for delimbing-/debarking logs and more particularly to a flail-type debarking apparatus wherein the flailing drums adjust to different sizes of logs.

BACKGROUND OF THE INVENTION

It has been found that bark and small limbs can be conveniently removed from logs by passing the log between a pair of upper and lower rotating drums that carry chain flails. The chain beats against the log to tear off small limbs and bark.

In order to take off the bark and limbs from all the way around the log, the chain flails on the upper drum must reach down along the sides of the log to at least the mid-point. Conversely, the chain flails on the lower drum must reach upwardly along the sides of the log to the mid-point.

The logs are conveyed lengthwise through the apparatus with the bottom of the logs at an established feed line. The lower drum is mounted below this feed line and the length of the lower drum chain flails is dictated by the diameter of the largest diameter logs to be fed through the apparatus. The upper drum is mounted, not just above the feed line, but above the feed line by an amount that will accommodate the largest diameter log. The length of the upper drum chain flails must reach down, not just to the mid-point of the largest diameter log, but down to the mid-point of the smallest diameter log supported at the feed line (and obviously at a lower point than the larger diameter log).

It will be appreciated that in apparatus prior to the present invention, the lower drum flail length may be required to be twenty inches long with six inches of the length between the drum and the feed line, and the remaining fourteen inches (the flailing portion) accommodating logs, e.g. from a four inch diameter to a twenty-eight inch diameter. The upper flail length however has to be extended an additional twelve inches to thirty-two inches in order to reach downwardly to the mid-point of the four inch log.

The additional twelve inches of length required for the upper flails adds height to the apparatus dimensions and creates design difficulties particularly for portable debarking apparatus. A shorter length flail is desirable for other reasons as well.

THE PRESENT INVENTION

The present invention enables a reduction in the length of the upper flails while still accommodating the full range of log sizes. In general the upper drum of the preferred embodiment is mounted so as to float up and down as required for the larger and smaller log diameters. Using the example given above, the upper chain flails need only have the same twenty inch length as the lower flails. In the upper position, the flails reach down to the mid-point of the large logs. As smaller logs are fed into the apparatus, the upper drum is lowered as needed to reach the log's mid-point.

The setting of the height of the upper drum is automatic. In the preferred embodiment the upper drum is carried on the free end of a pivotable arm structure. A pneumatic or hydraulic piston generates an upwardly directed balancing force against the arm structure. The weight of the upper drum and flails is substantially countered by the piston force so that relatively small additional force is required to raise the arm and drum. This additional force is provided by a gate across the infeed opening to the apparatus. The gate is attached to the arm structure and when a log is directed against the gate, the infeed force of the log pushes the gate inwardly and raises the arm structure. The larger the log, the wider the gate opening and the higher the resulting drum position.

The invention will be more fully understood by reference to the following detailed description and the drawings referred to wherein;

FIG. 3 is a schematic illustration of the apparatus of FIG. 1 showing a log being fed into the apparatus;

FIG. 4 is a further schematic illustration of the upper flailing drum and associated components;

FIG. 5 is a view as if taken from the exit end of the apparatus, indicated by view line 5—5 of FIG. 3; and FIG. 6 is a schematic illustration comparing the required flail length of a prior apparatus to that of the present invention.

Figure 1:
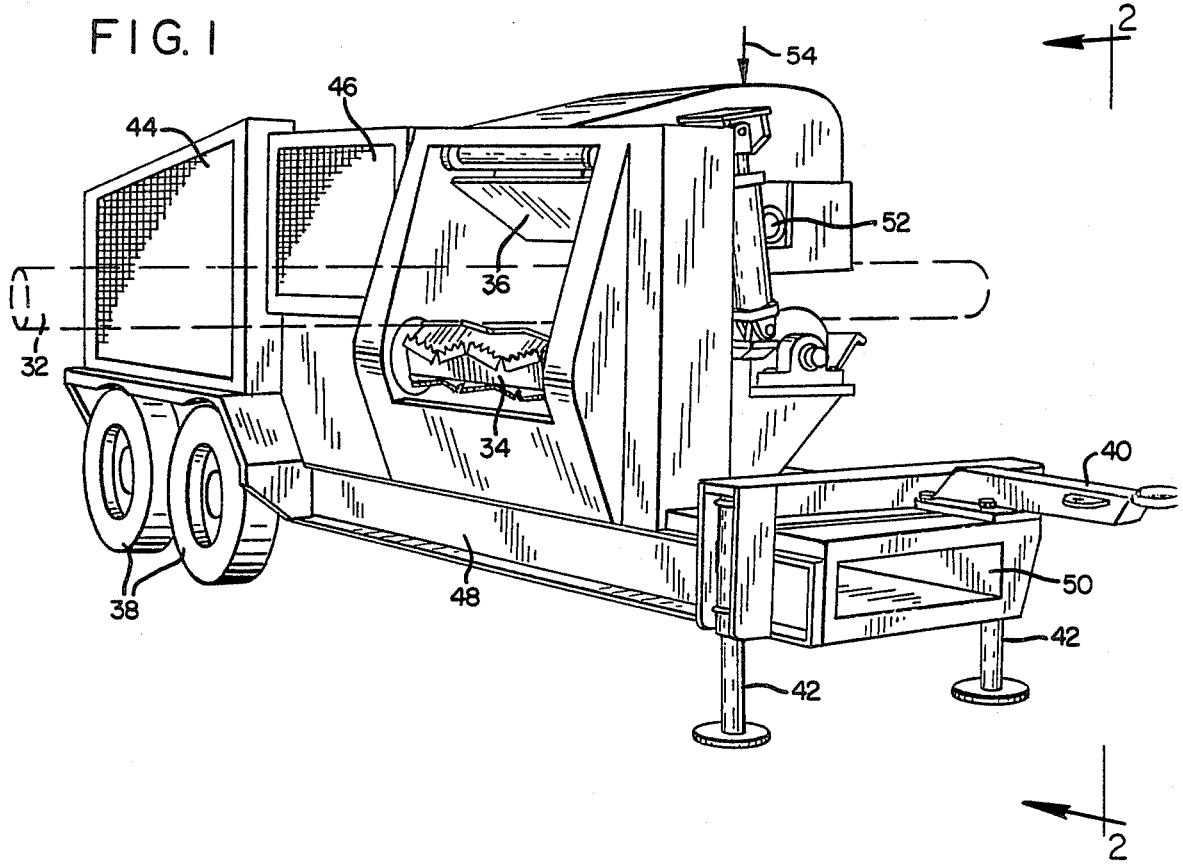
FIG. 1 illustrates a portable delimbing/debarking apparatus in accordance with the invention.

FIG. 6 is a schematic illustration of a side-by-side comparison of a prior apparatus (a) and an apparatus in accordance with the present invention (b). In the prior apparatus (a) the flailing drum is fixed and so is the axis 12 about which the flails 14 rotate. The larger diameter log is illustrated by dash line 16 and the small diameter log is illustrated by solid line 18. Center line 20 represents the mid-point of log 16 and center line 22 represents the mid-point of log 18.

In FIG. 6a, the center point 12 is fixed and the length of the flail 14 must reach the line 22. This length of the flail dictates the height 24 that the apparatus (a) must accommodate. In FIG. 6b, the axis 26 is adjustable as indicated by arrow 28 so that the maximum length of flails 14 only require a reach for the larger logs; i.e., to center line 20 with the axis 26 in the raised position. The maximum height 30 of flails 14 is thus substantially reduced as compared to the prior apparatus.

Reference is now made to FIG. 1 which illustrates a log 32 being fed by a feed roller 34, through gate 36. The invention is primarily directed to internal structure including a floating upper drum mounted inside the apparatus behind gate 36. It is not readily appreciated from FIG. 1. However, FIG. 1 is provided to illustrate the portability of the apparatus. The apparatus is supported on wheels 38 and designed to be pulled with tongue 40 hooked up to a vehicle (not shown). When set up for delimbing/debarking, stabilizers 42 are lowered as indicated. Rear area 44 is a container storage for fuel, etc., and container 46 houses the motors. Of particular note is the overall height that is dictated in part by the delimbing flails. The feed line at the top of feed roller 34 is established to enable a bottom flail to be mounted below this feed line and also for removal of the bark and limbs. Note the side delivery chute 48 (which ejects the bark through opening 50).

The position of the upper flailing drum is indicated in FIG. 1 by its shaft 52, and the circuitous path of the flails essentially reaches the top of the apparatus (arrow 54).

FIGS. 3 and 4 illustrate the concept of the invention. As shown logs 32 are fed into the apparatus by log handling grapples 56. The grapple and feed roller 34 force the log(s) 32 against the gate 36. The gate 36 is connected to an arm 58 that is pivoted at end 60. The opposite end of the arm 58 carries the upper drum 62 to which the chain flails 14 are attached. A hydraulic piston 64 is provided with a lifting force that substantially counter balances the weight of the arm 58, drum 62 and flails 14. The lifting force of the piston 64 can be adjusted as desired.

The force 66 effected by the log 32 against gate 36 pivots the gate inwardly and upwardly. This raises the attached arm 58 and drum 62 as indicated by arrows 68. Thus the path of the flails accommodate the dimensions of the large log 32. Smaller logs (dash lines 33) will pass under the gate 36 or raise it a lesser amount.

Figure 2:
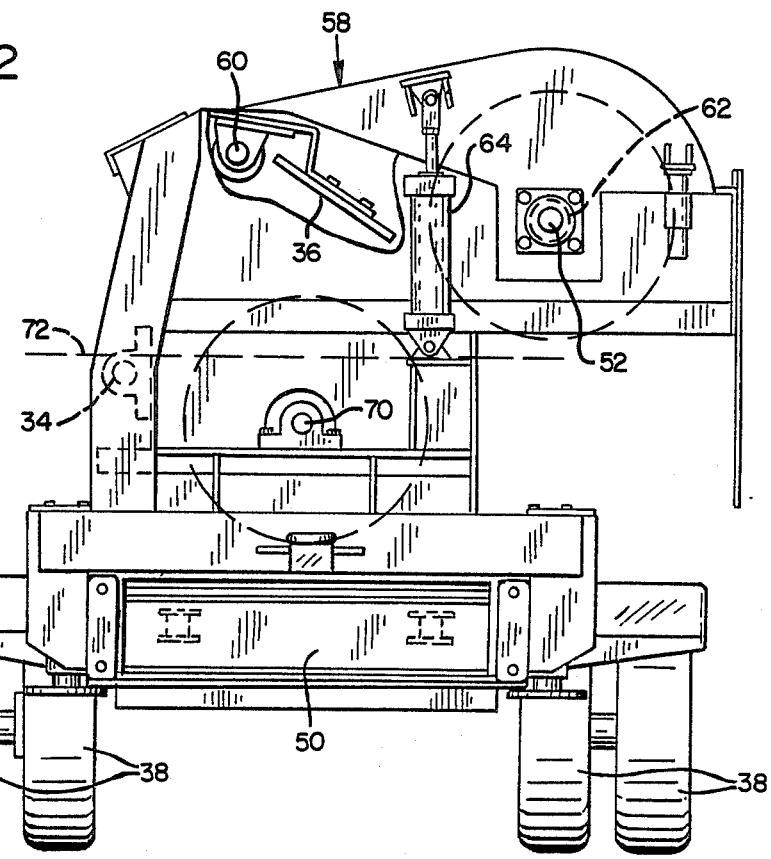
FIG. 2 is a section view as taken on section line 2—2 of FIG. 1.

The specific structure of the apparatus is illustrated in FIG. 2. The drum 62, its axle 52, and the enclosure or frame surrounding the drum and which constitutes the arm 58, are all pivoted at pivot 60. The counterbalancing cylinder 64 exerts an upward pressure to offset the weight of the upper drum and its components.

The lower drum has a fixed axle 70 mounted below the feed line 72 dictated by the position of infeed roller 34. Gate 36 is connected to the frame or arm 58. With the above explanation and the illustration of FIG. 2, a person skilled in the art will be able to readily incorporate the mechanical features common to log debarking/delimbing. FIG. 4 schematically illustrates the relationship of components for adjusting the height of the flails 14 for different sizes of logs.

FIG. 5 is an illustration of the cooperative effect of the flails and the upper and lower drums. Note, of course, that the two drums are offset front to back so that the flails of the two drums which appear to entangle, are actually spaced and simply sequentially overlap at the mid-point of the log to ensure debarking of the total log periphery.

The invention as described herein is directed to a concept of automatic adjustment of the relative upper and lower debarking drum positions to accommodate different sized logs. This is accomplished by mounting the upper drum so that it will move up and down within a limited range. A counterbalancing force offsets the weight so that the drum, in effect, floats up and down with the weight slightly greater than the offsetting force. A gate connected to the drum is forced open in varying amounts depending on the log size. The drum is raised a corresponding amount so that the chain flails carried by the drum consistently reach down to the mid-point of the log.

The shorter flail lengths of the floating drum accomplish the same or better removal of bark than is accomplished by the longer flail lengths of a fixed upper drum. These shorter flail lengths enable a more compact design of the apparatus. This is particularly important for portable units where it is difficult to design in the necessary features and still satisfy road restrictions.

Those skilled in the art will conceive of numerous variations without departing from the scope of the invention as encompassed by the appended claims.

We claim:

1. A debarking/delimbing apparatus comprising;
   a housing having an inlet and outlet for logs and defining therebetween a feed line, a lower flailing drum mounted in the housing for axial rotation crossway to the feed line, said lower drum mounted below the feed line, flails mounted to the drum and defining a path during rotative movement of the drum that projects above the feed line and against logs progressing along the feed line, said flails having a length sufficient to reach upwardly to the mid-point of logs progressing along the feed line,
   an arm structure pivotally mounted to the housing and having a pivotable arm end projected over the defined feed line, an upper flailing drum rotatably mounted at the arm end about an axis of rotation crossway to the feed line, upper and lower limiting means limiting the pivotable movement of the arm structure to limit the upper and lower movement of the upper drum, and flails mounted to the drum and defining a path during rotative movement that projects down toward the feed line and against logs progressing along the feed line, the flails having a length sufficient to reach the mid-point of smaller logs with the arm structure in the lowered position, and to the mid-point of larger logs in the raised position, and
   a movable gate connected to the arm structure whereby force applied to the gate discriminately raises the arm structure to accommodate different sizes of logs.

2. An apparatus as defined in claim 1 wherein a counterbalancing means is connected to said arm structure and generating a force at said arm end to substantially offset the gravity force imparted by the weight of the arm structure and flailing drum, and the gate is projected across the inlet for engagement by logs directed into the apparatus, said engagement imparting the additional force necessary to raise the arm structure.

3. An apparatus as defined in claim 2 wherein the gate is projected across the opening so as to require increased movement and opening to accommodate increased log sizes, said movement being correlated to the permitted arm movement to correspondingly raise the upper drum.

4. A debarking/delimbing apparatus comprising;
   a housing having an inlet and outlet for logs and defining therebetween a feed line, a lower flailing drum mounted in the housing for axial rotation crossway to the feed line, said lower drum mounted below the feed line, flails mounted to the drum and defining a path during rotative movement of the drum that projects above the feed line and against logs progressing along the feed line, said flails having a length sufficient to reach upwardly to the mid-point of logs progressing along the feed line,
   an upper drum carrying flails, mounting means mounting the upper drum for rotation of the flails about an axis projected crossway to the feed line, said mounting means providing limited vertical movement of the drum,
   a movable gate connected to the flailing drum whereby the force imparted for movement of the gate imparts upwardly directed force on the drum and raising thereof.

5. A debarking/delimbing apparatus as defined in claim 4 wherein counterbalancing means provides a counterbalancing force to substantially offset the weight of the flailing drum and enables raising thereof with reduced upwardly directed force.

* * * * *